_United States Patent_ [19]

Udding

[11] Patent Number: 4,925,881

[45] Date of Patent: May 15, 1990

[54] HEAT RESISTANT FOAMABLE THERMOSETTING RESIN SYSTEMS

[75] Inventor: Anne C. Udding, Amsterdam, Netherlands

[73] Assignee: Shell Oil Company, Houston, Tex.

[21] Appl. No.: 256,877

[22] Filed: Oct. 12, 1988

[30] Foreign Application Priority Data

Nov. 5, 1987 [GB] United Kingdom ............... 8725938

[51] Int. Cl.$^5$ ............... C08J 9/00; B12B 7/00
[52] U.S. Cl. ..................... 521/129; 521/119; 521/131; 521/137; 521/902; 521/156; 521/130; 264/328.2; 264/328.6
[58] Field of Search ............... 521/129, 131, 137, 156, 521/130, 902, 119; 264/328.2, 328.6

[56] References Cited

U.S. PATENT DOCUMENTS

| | | | |
|---|---|---|---|
| 3,404,106 | 10/1968 | Bearden et al. | 521/135 |
| 3,673,128 | 6/1972 | Hayash, Jr. et al. | 260/2.5 |
| 3,884,848 | 5/1975 | Ricciardi et al. | 521/130 |
| 3,914,190 | 10/1975 | Carroll et al. | 521/88 |
| 4,126,742 | 11/1978 | Carleton et al. | 528/57 |
| 4,536,490 | 8/1985 | Regelman | 502/167 |
| 4,737,564 | 4/1988 | Goel | 528/54 |

FOREIGN PATENT DOCUMENTS 62-156117 11/1987 Japan ................... 521/156
1474371 7/1973 United Kingdom .

Primary Examiner—John Kight
Assistant Examiner—Dennis R. Daley

[57] ABSTRACT

A foamable thermosetting resin system is disclosed comprising:
  (a) about 50 to about 85 weight percent, based on the weight of the composition, of a trimerisable polyisocyanate;
  (b) about 5 to about 20 weight percent of a liquid epoxy resin having an epoxy group content in the range from about 3500 to about 7500 mmol/kg;
  (c) about 5 to about 20 weight percent of a vinyl ester of a saturated aliphatic monocarboxylic acid in which the carboxyl group is attached to a tertiary or quarternary carbon atom;
  (d) about 1 to about 20 weight percent of a foaming agent, and
  (e) about 0.005 to about 5 weight percent of an isocyanate trimerization catalyst.

20 Claims, No Drawings

HEAT RESISTANT FOAMABLE THERMOSETTING RESIN SYSTEMS

BACKGROUND OF THE INVENTION

This invention relates to a thermosetting resin system, to a process for curing thermosetting resins, to cured thermosetting foams, and to products made therefrom.

When making thermosetting resin foams it is important that the resin system possess both an attractive reactivity and favorable friability. Reactivity is usually expressed in the so-called cream time and full rise time. Generally friability of foams made by hand mixing techniques, as opposed to mechanical mixing techniques, tends to be higher, and generally not suitable for practical application. Furthermore, it is generally necessary for the heat resistancy of the foams to be high enough to evidence no distortion or collapse at temperatures up to 240° C.

GB-1,474,371 discloses a heat resistant resin system comprising a polyisocyanate, an ethylenically unsaturated compound a Mannich base catalyst, and a catalytic amount of an epoxide. From the properties of the disclosed thermosetting resins, it follows that they must be free from voids. Thus the application of the disclosed resins in foamed form is not contemplated.

It is an object of the present invention to provide a foamable thermosetting resin system. It is another object of the present invention to provide thermosetting foams. It is also an object of the present invention to provide a process for curing thermosetting resin foams, and still another object of the present invention to provide thermosetting resin foams having a high heat distortion temperature, good reactivity and a favorable friability. It is still another object of this invention to provide for foamed articles.

BRIEF SUMMARY OF THE INVENTION

According to the invention there is provided a thermosetting resin composition containing the following elements:

(a) about 50 to about 85 weight percent, based on the weight of the composition, or a trimerisable polyisocyanate, (b) about 5 to about 20 weight percent of a liquid epoxy resin having an epoxy group content in the range from about 3500 to about 7500 mmol/kg, (c) about 5 to about 20 weight percent of a vinyl ester of a saturated aliphatic monocarboxylic acid in which the carboxyl group is attached to a tertiary or quaternary carbon atom, (d) about 1 to about 20 weight percent of a foaming agent, and (e) about 0.005 to about 5 weight percent of an isocyanate trimerization catalyst.

According to another aspect of this invention, there is provided a process for making a cured thermosetting resin foam comprising curing the above described thermosetting resin system.

According to still another aspect of this invention, there are provided a cured thermosetting resin foam.

According to another aspect of this invention, there is provided foamed articles.

DETAILED DESCRIPTION OF THE INVENTION

The thermosetting resin system of the invention includes a trimerisable polyisocyanate which is generally present in the resin system in the range from about 50 to about 85 weight percent. Suitable polyisocyanates include both aliphatic and aromatic polyisocyanates, which are defined as compounds in which the isocyanate groups are linked to aliphatic and aromatic groups, respectively.

Examples of suitable aromatic polyisocyanates include: meta- and paraphenylene di-isocyanate, toluene-2,4-di-isocyanate and toluene-2,6-di-isocyanate, naphthalene-1,5-di-isocyanate, diphenylmethane-4,4'-diisocyanate, triphenylmethane-4,4',4''-tri-isocyanate as well as any mixture of these compounds. Preferably diphenylmethane-4,4'-di-isocyanate (also referred to as 4,4'-diisocyanatodiphenylmethane) is used, most preferably in a liquid mixture with aromatic polyisocyanates which is commonly used for the polymerization of rigid polyurethane foams.

Suitable aliphatic polyisocyanates include for example: butane-1,4-di-isocyanate, hexane-1,5-di-isocyanate, 2,2,4-trimethylhexane di-isocyanate, dodecane-1,12-di-isocyanate, cyclohexane di-isocyanate, dicyclohexylmethane-4,4'-di-isocyanate, 2-butene-1,4-di-isocyanate, diethyl sulphide-2,2'-di-isocyanate, as well as any mixture of these compounds.

Although mixtures of aliphatic and aromatic polyisocyanates can be used, aromatic polyisocyanates are preferred, particularly those having an alkylidene group between two isocyanate-substituted aryl nuclei.

Generally any epoxy resin that is a liquid at ambient temperature is suitable for the invention composition. Examples of suitable epoxy resins include reaction products of epichlorohydrin and diphenylolpropane, preferably 2,2-di(4-hydroxyphenyl)propane. Generally the epoxy resins will have an epoxy group content in a range from about 3100 mmol/kg to about 7500 mmol/kg, preferably, in the range from about 5100 mmol/kg to about 5500 mmol/kg. The epoxy resin is generally present in a range from about 5 percent to about 20 percent by weight, based on the weight of the composition.

The vinyl ester of the present invention is generally a vinyl ester of an alkanoic acid. Preferably it is a vinyl ester of a saturated monocarboxylic acid having from about 9 to about 11 carbon atoms, in which the carboxyl group is attached to a tertiary or quarternary carbon atom, and in which the acid is alpha-dibranched. Preferably component (c) is a vinyl ester of an alkanoic acid having the general formula:

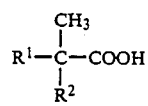

wherein $R^1$ and $R^2$ represent alkyl groups having a total of 7 carbon atoms. The vinyl ester is generally present in a range from about 5 percent to about 20 percent.

Component (d) can be any foaming agent, but is generally a low-boiling hydrocarbon or a halogenated hydrocarbon. Examples of low-boiling hydrocarbons include: pentane, hexane, heptane and mixtures thereof. Preferably, (d) is a halogenated hydrocarbon. Suitable halogenated hydrocarbons may be either fully or partially halogenated, and include, for example, difluorochloromethane, dichlorodifluoromethane, chlorotrifluoromethane, 1,1,2-trichloro-1,2,2,trifluoroethane, 1,1-dichloro-1-fluoroethane, 1-chloro-1,1-difluoro-2,2- dichloroethane, 1,1,1-tribromo-2-chloro-2-fluorobutane, dichloromethane, and trichlorofluoromethane. The most preferred halogenated hydrocarbon is trichlorofluoromethane.

Generally tertiary amines serve as isocyanate trimerization catalysts. Suitable tertiary amines include, for example, 1,3,5-tri(dialkylaminoalkyl)hexahydrotriazines, wherein the alkyl groups each have in the range from about 1 to about 10 carbon atoms, triethylenediamine and the C1-5 alkyl derivatives thereof; and mono(dialkylaminoalky) phenols and 2,4,6-tri(dialkylaminoalkyl) phenols, wherein the alkyl groups of the last two classes have from about 1 to about 5 carbon atoms each. The preferred tertiary amine is a 1,3,5-tri(-dialkylaminoalkyl) hexahydrotriazine, examples of which include 1,3,5-tri(diethylaminopropyl) hexahydrotriazine, and the preferred 1,3,5-tri(dimethylaminopropyl) hexahydrotriazine.

The isocyanate trimerization catalyst can be used in a suitable solvent. Preferably the solvent is a polypropylene glycol, most preferably, a polypropylene glycol having a molecular weight in the range from about 190 to about 210.

Additives such as dispersing agents, cell stabilizers, surfactants and flame retardants may optionally be incorporated into the thermosetting resin system of the present invention. For example, water-soluble organosilicone polymers may be present as surfactants to promote finer cell structure.

Another aspect of this invention relates to foams formed from the resin system comprising components (a), (b), (c), (d) and (e) as described above and a process for making such foams. Generally, the components can be brought together in a one-shot procedure whereby the trimerisable polyisocyanate and a mixture of the liquid epoxy resin and vinyl ester, in the presence of the foaming agent and an isocyanate trimerization catalyst, are mixed together with agitation sufficient to form foam. The trimerisable polyisocyanate may be mixed with a mixture of liquid epoxy resin, vinyl ester, foaming agent and trimerization catalyst. Alternatively, the components can be mixed in a two step process in which all of the components except the trimerization catalyst are mixed in a preliminary step, afterwhich, the catalyst is added to the resulting mixture under vigorous agitation.

The agitation of the mixture may generally be carried out by any known method using agitation means sufficient to ensure homogeneity in the resultant thermosetting resin system. Mixing can be accomplished by hand, but is preferably carried out by mechanical methods, for example, various mixing and dispensing machines, as well as spraying devices.

The foam will be spontaneously formed after agitating the components together, so it is not necessary to employ any heat to initiate the formation of foam. Immediately after the agitation is complete, the reaction mixture is transferred to a mold and foaming is allowed to take place.

The cured resin foams of the present invention are cellular products and can be used for all purposes where cellular products are conventionally used, and are especially suitable for applications where thermal resistance and low flame spread is required. Uses include for example, thermal insulation in firewalls, insulation material for high temperature pipe lines, in supersonic aircraft and in missiles.

EXAMPLE 1

This example illustrates the invention resin system, resin foam, and process for forming the foam. Two streams were mixed in a Krauss-Maffei 30/40 high-pressure reaction injection molding machine (RIM).

The following summarizes the composition of the first stream in parts by weight (pbw):

| Ingredient | Description |
| --- | --- |
| 80 pbw CARADATE 30 | Trademark for a mixture of polyisocyanates with 4,4'-diisocyanto-diphenylmethane as the main component, the —N=C=O content being higher than 30.2% and the diisocyanate content (molecular weight 250) being higher than 90.0%. |

The following summarizes the composition of the second stream in parts by weight (pbw):

| Ingredient | Description |
| --- | --- |
| 10 pbw EPIKOTE 828 | Trademark for a reaction product of epichlorohydrin and diphenylol propane, having an epoxy group content of 5150 mmol/kg to 5490 mmol/kg. |
| 10 pbw VeoVa 10 | Trademark for the vinyl ester of a saturated monocarboxylic acid of highly branched structure, the acid containing 10 carbon atoms per molecule and having a methyl group at the alpha position with respect to the carboxyl group. |
| 1 pbw Silicone B 1048 | Trademark for a surfactant from Th. Goldschmidt AG. |
| 7 pbw TCFM | Trichlorofluoromethane |
| 2 pbw T 45 | Mixture consisting of 50% of 1,3,5-tri (dimethylaminopropyl)hexahydrotriazine and 50% of a 65% solution of potassium octoate in polypropyleneglycol having a molecular weight of 200. |

The weight ratio of the first to the second stream was 8:3. The total output of the machine was 110 kg per minute. One bag shot had a weight of 2 kg and the dispense pressure was 150 bar.

The reactivity of the system in a bag shot was: cream time 18 seconds, full rise time 41 seconds.

The system was used for preparing moldings having a volume of 18 liters. The foams had very fine cells, a high closed cell content (94 percent), good insulation value (0.020 W/m.K), a high heat distortion temperature (above 240° C.), and friability of 40 percent as determined according to ASTM-C 421-71. The density was 50 kg/m$^3$ and the compressive strength is presented in Table 1.

TABLE 1

| Temperature; C | Compressive Strength, kN/m$^2$ |
| --- | --- |
| 20 | 335 |
| 60 | 275 |
| 120 | 220 |
| 180 | 200 |

EXAMPLE 2

This example was identical to Example 1 except that the second stream was left in the machine to check its stability. After one day, the resulting reactivity was virtually the same: cream time 19 seconds, full rise time 43 seconds. After four days the reactivity was slightly changed: cream time 22 seconds, full rise time 47 seconds. The system thus demonstrated adequate stability for machine processing.

I claim:

1. A composition comprising:
   (a) about 50 to about 85 weight percent, based on the weight of the composition, of a trimerisable polyisocyanate;
   (b) about 5 to about 20 weight percent of a liquid epoxy resin having an epoxy group content in the range from about 3500 to about 7500 mmol/kg;
   (c) about 5 to about 20 weight percent of a vinyl ester of a saturated aliphatic monocarboxylic acid in which the carboxyl group is attached to a tertiary or quarternary carbon atom;
   (d) about 1 to about 20 weight percent of a foaming agent, and
   (e) about 0.005 to about 5 weight percent of an isocyanate trimerization catalyst.

2. A foam formed from the composition of claim 1.

3. The composition of claim 1 wherein the trimerizable polyisocyanate is selected from the group consisting of aliphatic and aromatic polyisocyanates, and combinations thereof; the liquid epoxy resin comprises the reaction product of epichlorohydrin and diphenylolpropane and has an epoxy group content in the range of about 5100 mmol/kg to about 5500 mmol/kg; component (c) is a vinyl ester of an alpha dibranched alkanoic acid having in the range from about 9 to about 11 carbon atoms per molecule; the foaming agent is selected from the group consisting of halogenated hydrocarbons and low-boiling hydrocarbons; and the isocyanate trimerization catalyst is a tertiary amine catalyst.

4. A composition of claim 3 wherein the vinyl ester is one of an alkanoic acid having the general formula:

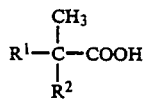

wherein $R^1$ and $R^2$ represent alkyl groups having a total of 7 carbon atoms.

5. A foam formed from the composition of claim 3.

6. The composition of claim 1 wherein the trimerisable polyisocyanate is an aromatic polyisocyanates; the liquid epoxy resin comprises the reaction product of epichlorohydrin and 2,2-di(hydroxyphenyl) propane; component (c) is a vinyl ester of an alkanoic acid having the general formula:

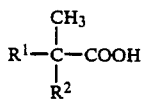

in which $R^1$ and $R^2$ represent alkyl groups having a total of 7 carbon atoms; the foaming agent is a halogenated hydrocarbon selected from the group consisting of difluorochloromethane, dichlorofluoromethane, chlorotrifluoromethane, 1,1,2-trichloro-1,2,2-trifluoroethane, 1,1-dichloro-1-fluoroethane, 1-chloro-1,1-difluoro-2,2-dichloroethane, 1,1,1-tribromo-2-chloro-2-fluorobutane, dichloromethane, trichlorofluoromethane and mixtures thereof.

7. The composition of claim 6 wherein the trimerisable polyisocyanate is diphenylmethane-4,4'-di-isocyanate, and wherein the foaming agent is trichlorofluoromethane.

8. A foam formed from the composition of claim 6.

9. A process for making a foam comprising contacting, with agitation, components comprising:
   (a) about 50 to about 85 weight percent, based on the weight of the composition, of a trimerisable polyisocyanate;
   (b) about 5 to about 20 weight percent of a liquid epoxy resin having an epoxy group content in the range from about 3500 to about 7500 mmol/kg;
   (c) about 5 to about 20 weight percent of a vinyl ester of a saturated aliphatic monocarboxylic acid in which the carboxyl group is attached to a tertiary or quarternary carbon atom;
   (d) about 1 to about 20 weight percent of a foaming agent, and
   (e) about 0.005 to about 5 weight percent of an isocyanate trimerization catalyst.

10. The process of claim 9 wherein the trimerizable polyisocyanate is selected from the group consisting of aliphatic and aromatic polyisocyanates, and combinations thereof; the liquid epoxy resin comprises the reaction product of epichlorohydrin and diphenylolpropane, having in the range from about 5100 mmol/kg to about 500 mmol/kg; component (c) is a vinyl ester of an alpha dibranched alkanoic acid having in the range from about 9 to about 11 carbon atoms per molecule; the foaming agent is selected from the group consisting of halogenated hydrocarbons and low-boiling hydrocarbons; and the isocyanate trimerization catalyst is a tertiary amine catalyst.

11. The process of claim 10 wherein said contacting is effected in a mold.

12. The process of claim 10 wherein said contacting is a step in a reaction molding process.

13. The process of claim 10 wherein component (c) is a vinyl ester of an alkanoic acid having the general formula:

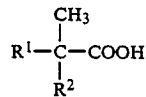

wherein $R^1$ and $R^2$ represent alkyl groups having a total of 7 carbon atoms.

14. The process of claim 9 wherein the trimerisable polyisocyanate is selected from a group consisting of aromatic polyisocyanates and mixtures thereof; wherein the liquid epoxy resin comprises the reaction product of epichlorohydrin and 2,2-di(hydroxyphenyl) propane; component (c) is a vinyl ester of an alkanoic acid having the general formula:

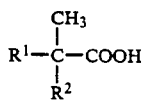

in which $R^1$ and $R^2$ represent alkyl groups having a total of 7 carbon atoms, wherein the foaming agent is a halogenated hydrocarbon is selected from the group consisting of difluorochloromethane, dichlorofluoromethane, chlorotrifluoromethane, 1,1,2-trichloro-1,2,2-trifluoroethane, 1,1-dichloro-1-fluoroethane, 1-chloro-1,1-difluoro-2,2-dichloroethane, 1,1,1-tribromo-2-chloro-2- fluorobutane, dichloromethane, trichlorofluoromethane and mixtures thereof.

15. The process of claim 14 wherein the trimerisable polyisocyanate is diphenylmethane-4,4'-di-isocyanate, and wherein the foaming agent is trichlorofluoromethane.

16. A foam formed from the process of claim 9.

17. A foam formed from the process of claim 10.

18. A foam formed from the process of claim 14.

19. A foamed article of manufacture formed from the process of claim 9.

20. A foamed article of manufacture formed from the process of claim 14.

* * * * *